United States Patent Office 3,467,295
Patented Sept. 16, 1969

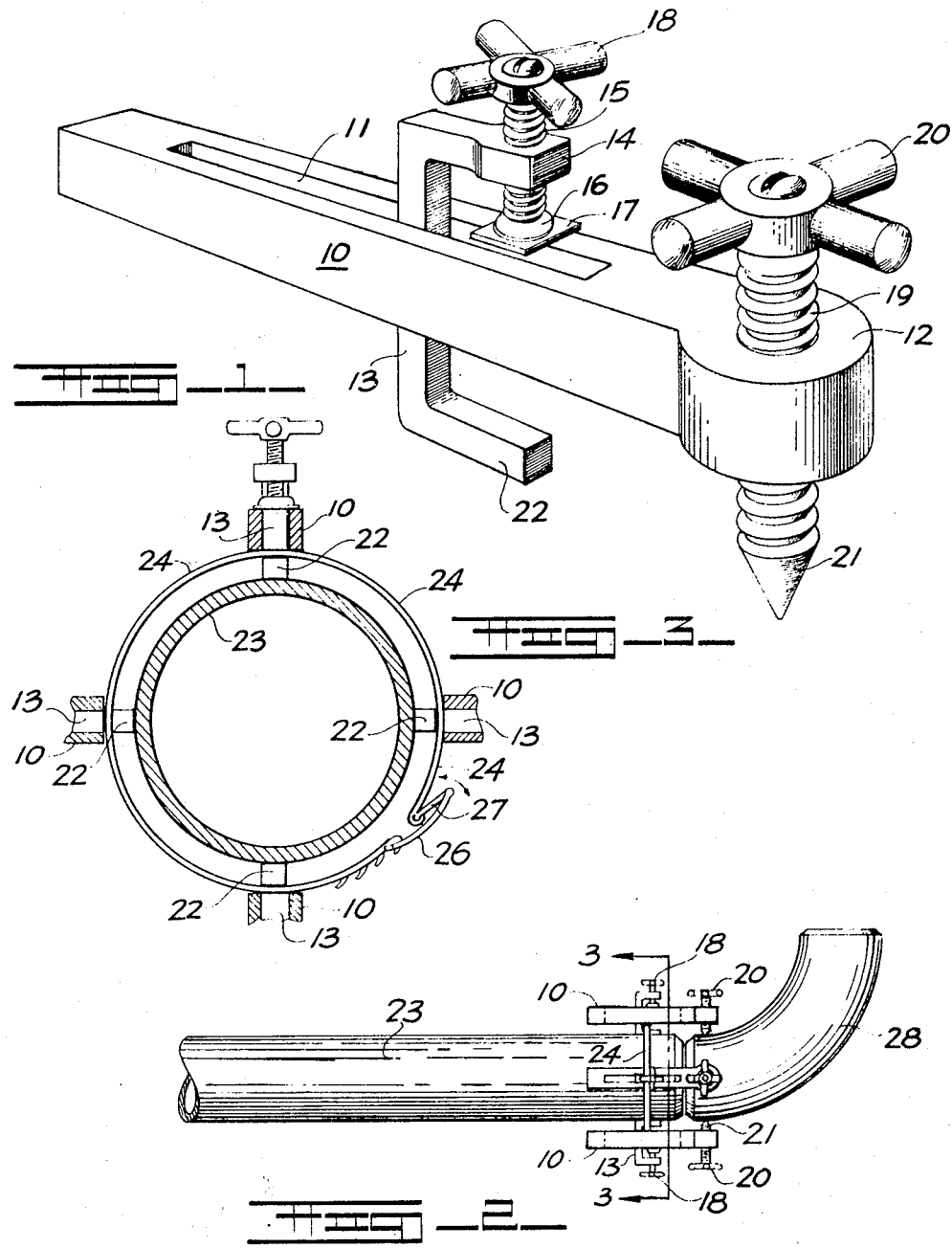

3,467,295
CLAMPING MEANS FOR PIPES AND FITTINGS
Robert L. Watson, Box 295, R.D. 2,
Lowellville, Ohio 44436
Filed June 23, 1967, Ser. No. 648,318
Int. Cl. B23k 37/04, 1/14
U.S. Cl. 228—49                                4 Claims

ABSTRACT OF THE DISCLOSURE

A clamp for securing a curved section of pipe or the like, in proper position relative to the end of another section of pipe, to facilitate welding of the two sections to one another, and wherein the clamping means is adjustable for moving the sections relative to one another for desired alignment of the same.

---

The principal object of the invention is the provision of a clamping device that will adjustably hold one section of pipe in position adjacent another section, and particularly a curved section, so that the same may be conveniently welded while so positioned.

A further object of the invention is the provision of a clamping device for holding sections of pipe in desired alignment and which device is easy to install, does not interfere with the welding of the ends of the sections to one another, and which is capable of easy removal after the welding is completed.

A still further object of the invention is the provision of a clamping means for temporarily securing sections of pipe to one another, preparatory to welding the same, and wherein one of the sections of pipe may be moved at right angles to the other to obtain a desired alignment between the pipe sections.

The clamping means for pipes and fittings disclosed herein makes possible the accurate registry of one end of a tubular fitting with an adjacent end of a tubular conduit such as a pipe or the like, so that the fitting and the conduit may be welded to one another. Heretofore it has been difficult to hold a fitting in proper position for welding it to a conduit or other tubular member, and such pipe clamps as have been known in the art are formed so that they make welding difficult, if not impossible. The present invention not only positions the fitting relative to the conduit or pipe in desired relation, but provides ample clearance for the welding operation to be performed.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a clamp for securing one tubular member to another.

FIGURE 2 is a side elevation of a section of pipe and a tubular fitting and clamping means holding the same in welding position.

FIGURE 3 is an enlarged vertical section on line 3—3 of FIGURE 2.

By referring to the drawing, and FIGURE 1 thereof, a clamping arm 10 will be seen to be provided with a longitudinal vertically positioned slot 11 therein and an enlarged circular end portion 12 is formed on one end of the arm 10. A C-shaped body member 13 is positioned through the slot 11 and the upper horizontal portion 14 of the C-shaped member is enlarged and provided with a vertical opening which is threaded for the reception of a bolt 15, which is rotatably engaged in a socket 16 on a pressure plate 17, which in turn is positioned in spaced relation to the upper surface of the clamping arm 10. The upper end of the bolt 15 is provided with a handle 18 by which the bolt may be rotated. Rotation of the handle 18 will therefore move the pressure plate 17 vertically and toward and away from the upper surface of the clamping arm 10. The circular end portion 12 of the clamp arm 10 is provided with a vertical opening which is threaded and a secondary bolt 19 is positioned therethrough. A secondary handle 20 is affixed to the upper end of the secondary bolt 19 and the lower end of the secondary bolt 19 is pointed as at 21. Rotation of the handle 20 will therefore rotate the bolt 19 and move the pointed end 21 thereof vertically. The lower horizontal portion of the C-shaped body member 13 is indicated by the numeral 22 and its lower surface is flat and adapted to be engaged on the outer surface of a pipe such as shown in FIGURES 2 and 3 of the drawing, and indicated by the numeral 23.

By referring now to FIGURES 2 and 3 of the drawing, it will be seen that four of the clamp arms and associated members seen in FIGURE 1 of the drawing, are shown in circumferentially spaced position around the pipe 23 and secured thereto by engagement with a pipe clamp 24 which comprises an annular metal band with a compression clamp 25 on the ends thereof. The compression clamp includes the interconnected pivoted levers 26 and 27 arranged to be moved, as known in the art, to force the ends of the annular member 24 of the pipe clamp toward one another. The compression clamp members 26 and 27 move into an over-center relation to their pivotal engagement with the band 24 of the device, to securely fasten the pipe clamp about an object. The pipe clamp 24 is thus positioned over the plurality of horizontal portions 22 of the C-shaped body member 13 and thereby securely positions them in circumferentially spaced relation around the outer surface of the pipe 23. In such position the clamp arms 10 extend parallel with the axis of the pipe 23 and outwardly beyond the end thereof, so that the threaded bolts 19 with their pointed ends 21 may be selectively engaged upon a pipe fitting 28 inwardly from the end thereof, as seen in FIGURE 2 of the drawing. By moving the handles 20 the points 21 will engage the end of the fitting 28 in spaced relation to its actual end portion, and thus enable it to be positioned in desired alignment with the end of the pipe 23. In such position it will be firmly held by the device of the invention, whereupon it can be welded and it will be observed that the welding operation can take place because the clamp arms 10 are spaced radially from the pipes 23 and 28, and thus will not interfere with welding the same together. It will thus be seen that a clamping means for pipes and fittings has been disclosed which meets the several objects of the invention, and having thus described my invention, what I claim is:

1. A clamping device for holding a pipe and fittings in temporary alignment and comprising a plurality of clamp assemblies, each of which includes a clamp arm having a longitudinally extending vertical slot therein, a C-shaped body member positioned in each of the slotted clamp arms, means on said C-shaped body member for moving the clamp arm relative thereto, and secondary means on one end of said clamp arm for selectively engaging said fitting, and means holding said plurality of clamping assemblies on said pipe.

2. The clamping device set forth in claim 1 and wherein the means holding the plurality of clamp assemblies comprises a band encircling said pipe and portions of said C-shaped body member and means detachably connecting the ends of said band.

3. The clamping device set forth in claim 1 and wherein the means on said C-shaped body member movably engaging said clamp arm comprises a bolt positioned in a threaded aperture in a horizontal portion of said C-shaped body member, a pressure plate on one end of said bolt and means on the other for imparting rotation thereto.

4. The clamping device set forth in claim 1 and wherein the secondary means on said clamp arm for selectively engaging said fitting comprises a threaded pointed bolt positioned through a threaded opening in said clamp arm and perpendicular to the longitudinal axis of said clamp arm and parallel with said vertical slot therein.

References Cited

UNITED STATES PATENTS

| | | | |
|---|---|---|---|
| 2,102,259 | 12/1937 | Edwards | 219—158 |
| 2,320,805 | 6/1943 | Smith. | |
| 3,380,148 | 4/1968 | Nelson | 29—464 |

RICHARD H. EANES, JR., Primary Examiner